(12) United States Patent
Choe et al.

(10) Patent No.: US 9,319,498 B2
(45) Date of Patent: Apr. 19, 2016

(54) PORTABLE ELECTRONIC DEVICE

(71) Applicant: KYOCERA Corporation, Kyoto-shi, Kyoto (JP)

(72) Inventors: Kangmin Choe, Kyoto (JP); Keigo Kawamura, Kyoto (JP)

(73) Assignee: KYOCERA CORPORATION (JP)

( * ) Notice: Subject to any disclaimer, the term of this patent is extended or adjusted under 35 U.S.C. 154(b) by 0 days.

(21) Appl. No.: 14/436,459

(22) PCT Filed: Oct. 15, 2013

(86) PCT No.: PCT/JP2013/078014
§ 371 (c)(1),
(2) Date: Apr. 16, 2015

(87) PCT Pub. No.: WO2014/061679
PCT Pub. Date: Apr. 24, 2014

(65) Prior Publication Data
US 2015/0256657 A1    Sep. 10, 2015

(30) Foreign Application Priority Data

Oct. 16, 2012 (JP) ................... 2012-229018

(51) Int. Cl.
*H04M 1/00* (2006.01)
*H04M 1/02* (2006.01)
*H04M 1/03* (2006.01)

(52) U.S. Cl.
CPC ............... *H04M 1/026* (2013.01); *H04M 1/03* (2013.01); *H04M 1/0202* (2013.01)

(58) Field of Classification Search
CPC ...... H04M 1/0202; H04M 1/026; H04M 1/03
USPC ......... 455/575.1–575.4, 575.8; 361/752, 814; 379/433.01
See application file for complete search history.

(56) References Cited

U.S. PATENT DOCUMENTS

| 7,469,156 | B2 * | 12/2008 | Kota .................... | G06F 1/1624 455/556.1 |
| 2005/0181745 | A1 * | 8/2005 | Wood .................. | H04B 1/3888 455/90.3 |
| 2014/0004913 | A1 * | 1/2014 | Kimura ................ | H04M 1/035 455/575.1 |

FOREIGN PATENT DOCUMENTS

| GB | 2357212 A | 6/2001 |
| JP | 2001-103146 A | 4/2001 |

(Continued)

OTHER PUBLICATIONS

International Search Report dated Nov. 26, 2013 issued for International Patent Application No. PCT/JP2013/078014.

*Primary Examiner* — Charles Shedrick
(74) *Attorney, Agent, or Firm* — Procopio Cory Hargreaves and Savitch LLP

(57) ABSTRACT

A portable electronic device 1 of the present invention is provided with: a first body 2A; a second body 2B, which can be arranged in either a first state of engaging with the first body 2A, or a second state of not engaging with the first body 2A, and one end side which has a concave portion 13, to which an external force is applied so as to transition from the first state to the second state; a sound input unit 31, which is provided between the first body 2A and the second body 2B; and a communicating portion 23 for establishing communication between the concave portion 13 of the second body 2B and the sound input unit 31, in the first state.

8 Claims, 5 Drawing Sheets

(56) References Cited

FOREIGN PATENT DOCUMENTS

| | | |
|---|---|---|
| JP | 2006-345048 A | 12/2006 |
| JP | 2012-181826 A | 1/2012 |
| JP | 2012-195835 A | 10/2012 |
| WO | 2012/124348 A1 | 9/2012 |

* cited by examiner

PORTABLE ELECTRONIC DEVICE

TECHNICAL FIELD

The present invention relates to a portable electronic device such as a mobile telephone device.

BACKGROUND ART

A portable electronic device such as a portable terminal device is provided with a microphone, into which sound produced by a user is input, when making a phone call or recording sound. Conventionally, a portable terminal device, which is called a smartphone, is provided with a microphone sound hole in a vicinity of a touch screen display, for the purpose of transmitting sound produced by a user to a microphone (for example, refer to Patent Document 1).

Patent Document 1: Japanese Unexamined Patent Application, Publication No. 2012-181826

DISCLOSURE OF THE INVENTION

Problems to be Solved by the Invention

A smartphone is required to have both good performance and good design. However, a microphone sound hole, which is provided to a body, has been a factor to deteriorate design.

An object of the present invention is to provide a well-designed portable terminal device, while maintaining microphone performance.

Means for Solving the Problems

A portable electronic device according to the present invention is provided with: a first body; a second body, which can be arranged in either a first state of engaging with the first body, or a second state of not engaging with the first body, and one end side which has a concave portion, to which an external force is applied so as to transition from the first state to the second state; a sound input unit, which is provided between the first body and the second body; and a communicating portion for establishing communication between the concave portion of the second body and the sound input unit, in the first state.

The communicating portion may establish communication, through at least one bent region, between the concave portion of the second body and the sound input unit.

In the portable electronic device according to the present invention, the communicating portion may establish substantially linear communication between the concave portion of the second body and the sound input unit. The portable electronic device according to claim 1.

The present invention may be further provided with an intermediate body, which is arranged between the first body and the second body, and which is provided with the sound input unit and the communicating portion; and in the first state, the concave portion of the second body may be located closer to the first body side than an end of the intermediate body, the end being adjacent to the concave portion.

Effects of the Invention

According to the present invention, a well-designed portable terminal device can be provided, while maintaining microphone performance.

PREFERRED MODE FOR CARRYING OUT THE INVENTION

Descriptions are provided below with reference to the drawings, with respect to embodiments of cases where a portable electronic device according to the present invention is applied to a portable terminal device.

First Embodiment

Figure 1:
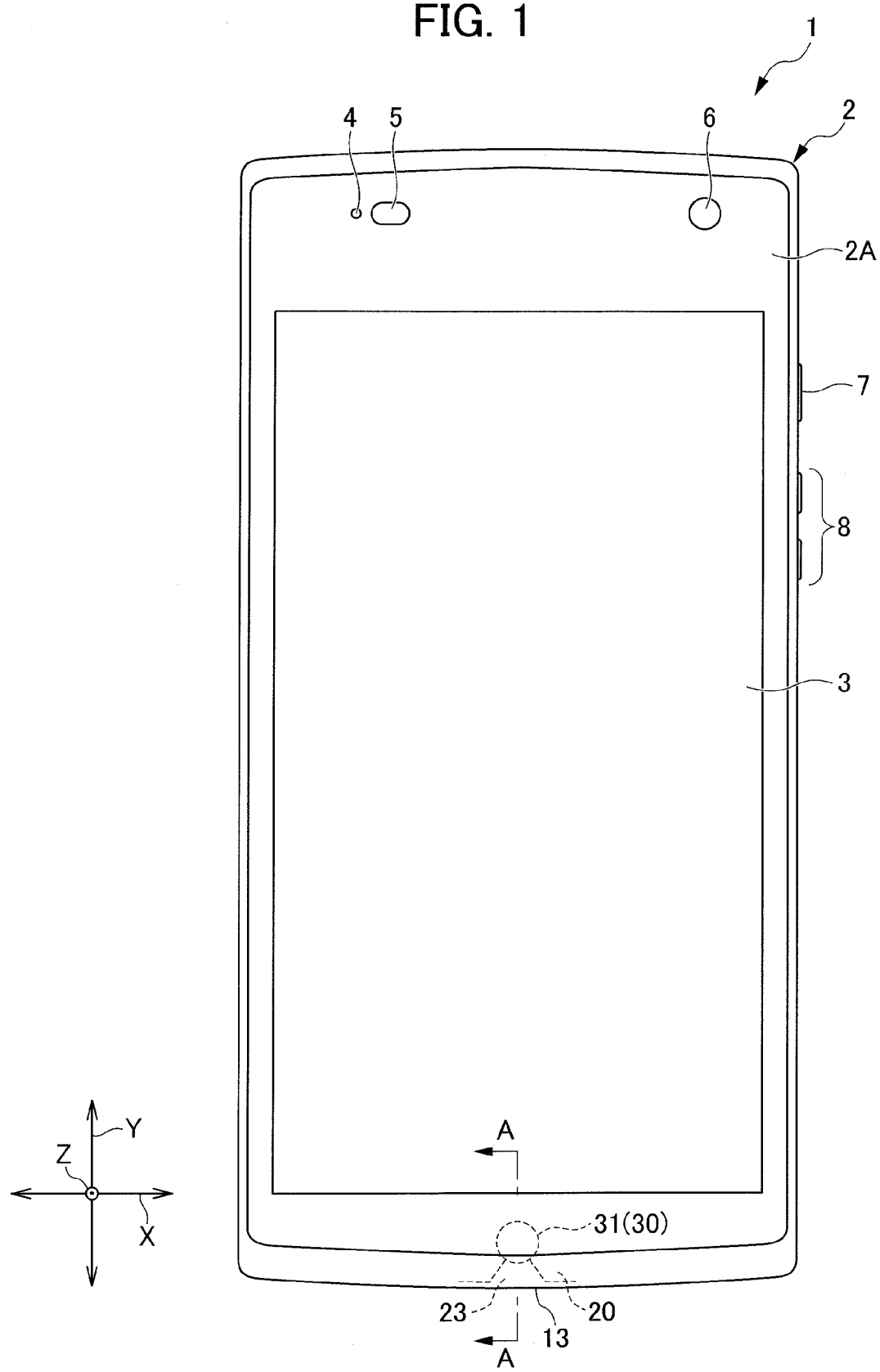
FIG. 1 is a front view showing an external appearance of a portable terminal device 1 in a first embodiment.
Figure 2:
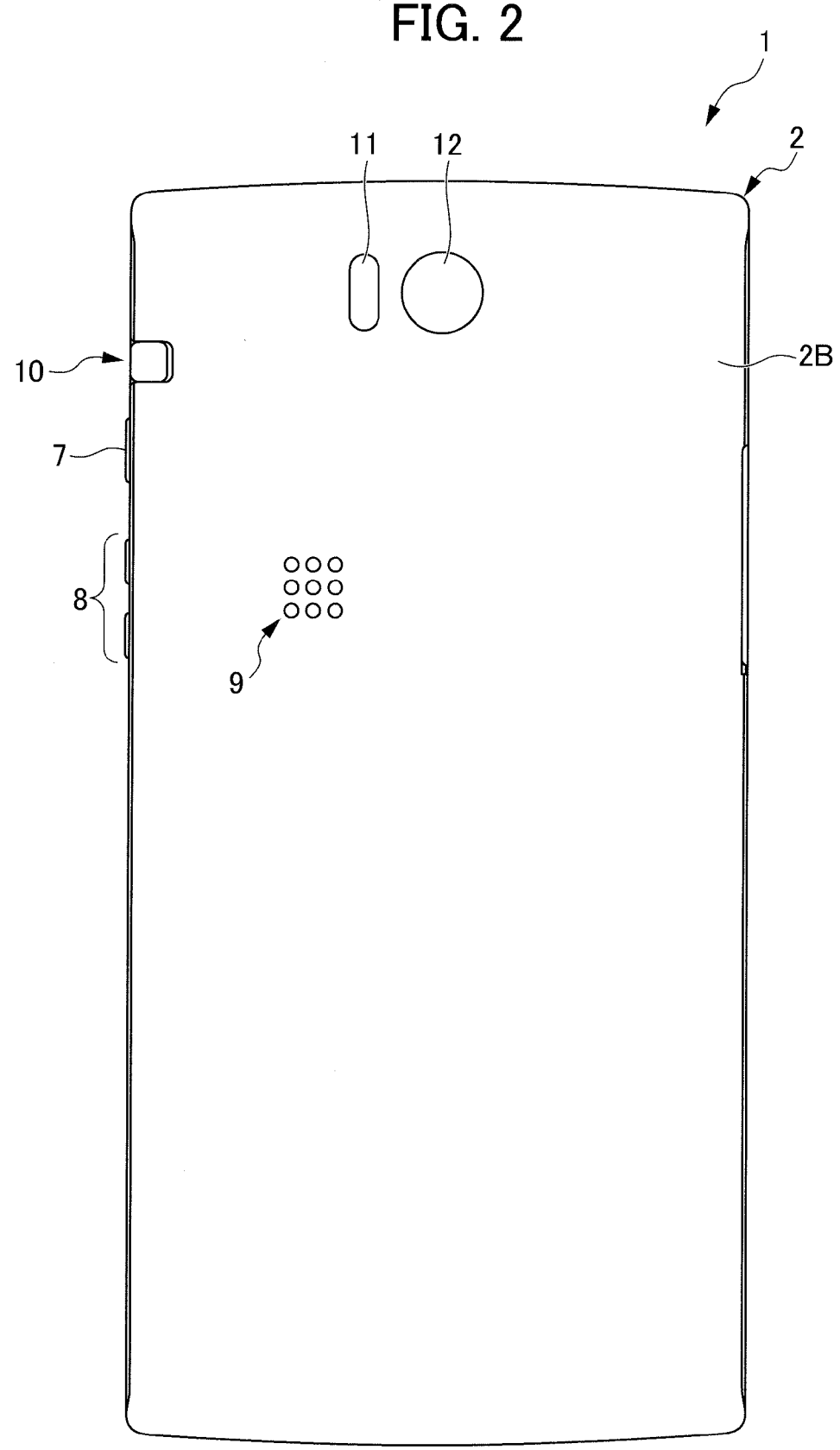
FIG. 2 is a rear view showing an external appearance of the portable terminal device 1 in the first embodiment.
Figure 3:
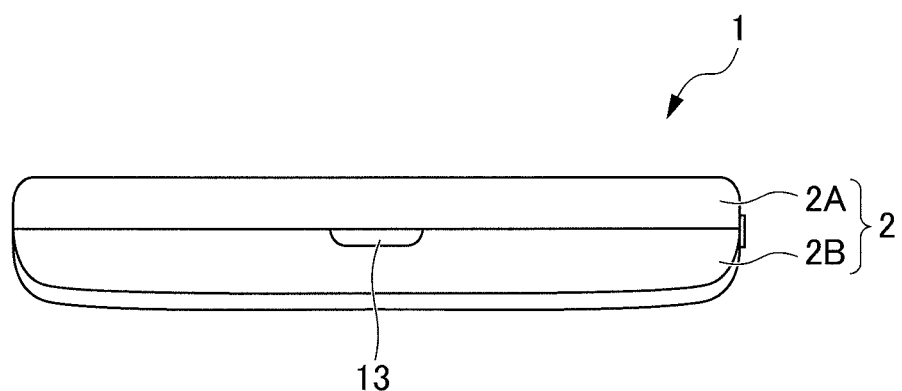
FIG. 3 is a bottom view showing an external appearance of the portable terminal device 1 in the first embodiment.
Figure 4:
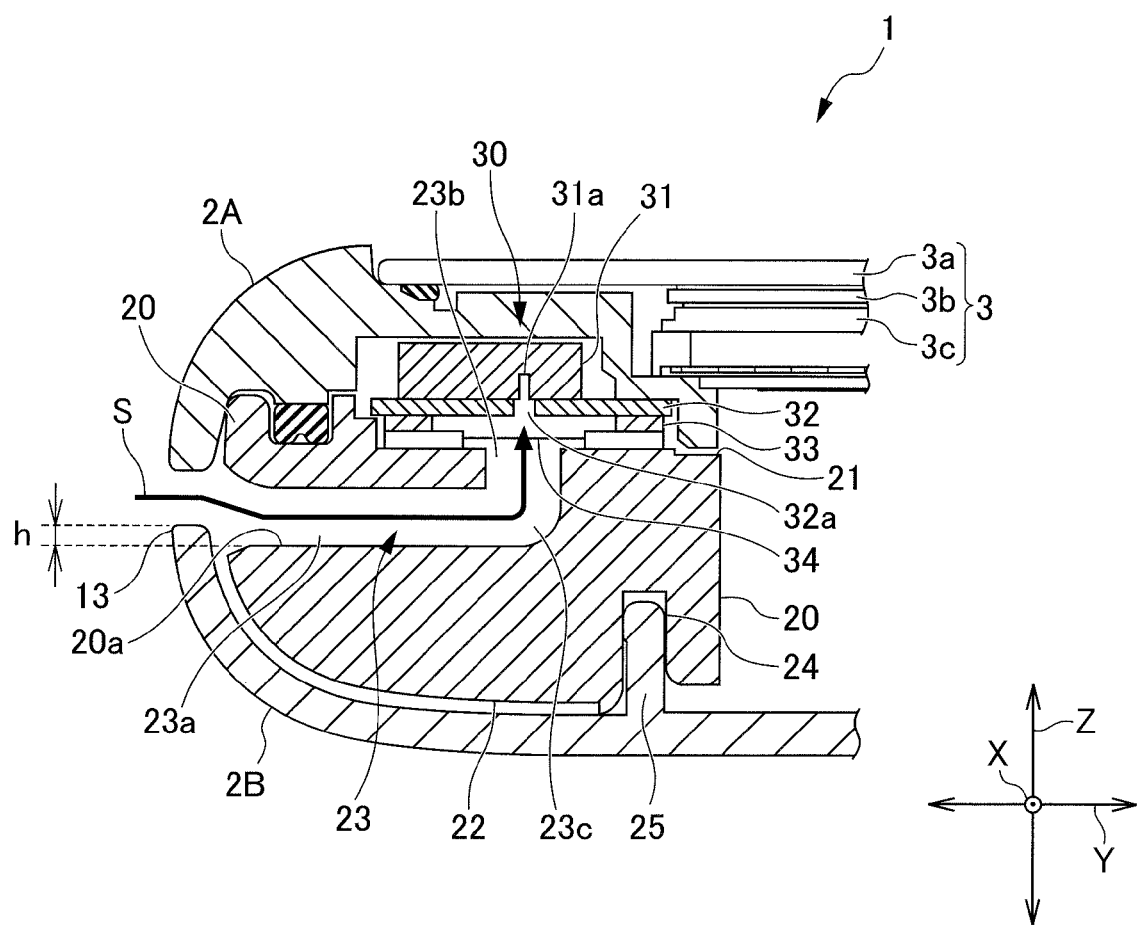
FIG. 4 is a schematic cross-sectional view corresponding to a cross section along a line A-A in FIG. 1.
Figure 5:
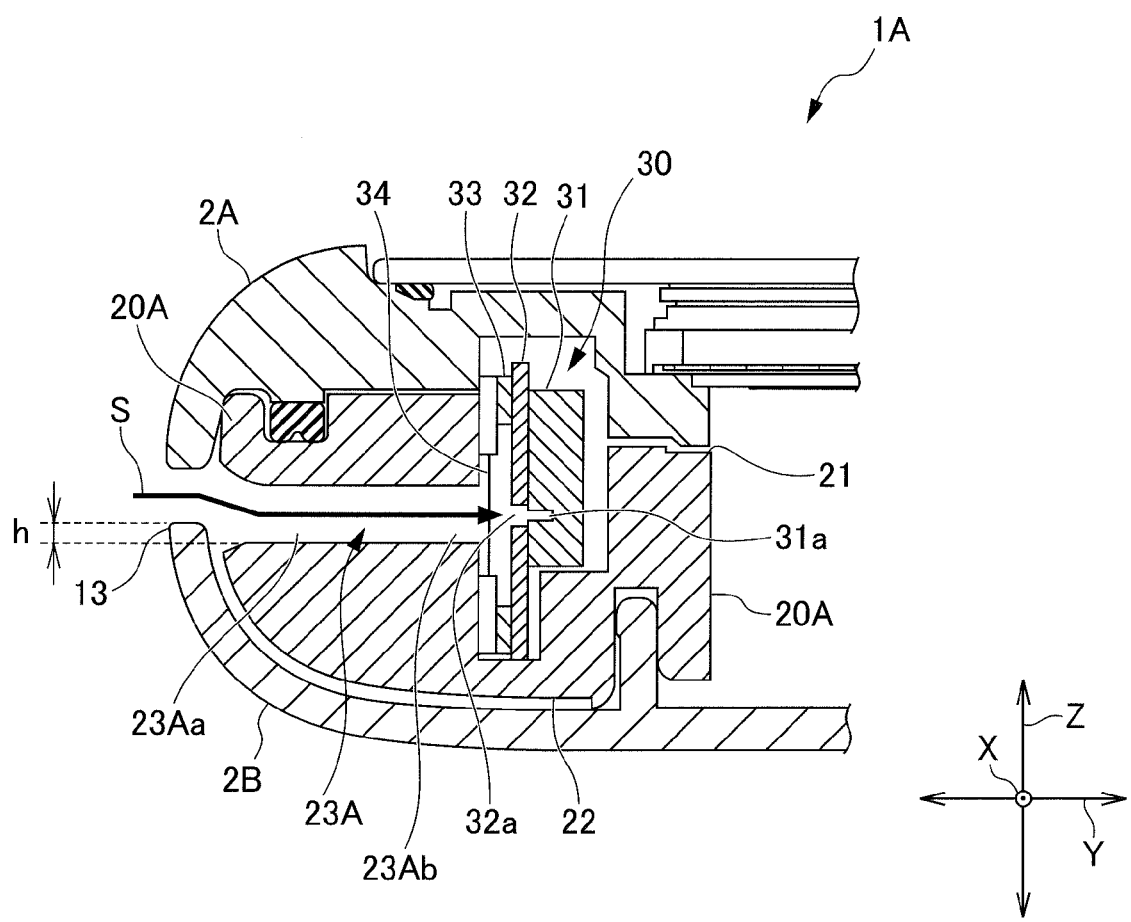
FIG. 5 is a schematic cross-sectional view showing characteristic portions of a portable terminal device 1A in a second embodiment.

First of all, an overall configuration of a portable terminal device 1 in a first embodiment is described. FIG. 1 is a front view showing an external appearance of the portable terminal device 1 in the first embodiment. FIG. 2 is a rear view showing an external appearance of the portable terminal device 1 in the first embodiment. FIG. 3 is a bottom view showing an external appearance of the portable terminal device 1 in the first embodiment. FIG. 4 is a schematic cross-sectional view corresponding to a cross section along a line A-A in FIG. 1. Note that FIGS. 1, 4 and 5 (to be described later) each show coordinate systems of the portable terminal device 1, i.e. a first direction (X-direction), a second direction (Y-direction), and a third direction (Z-direction).

As shown in FIGS. 1 to 3, the portable terminal device 1 has a body 2, which is a main body unit. The body 2 has a first body 2A and a second body 2B. The first body 2A is a member, which is arranged to the side that faces a user. A touch screen display 3 (to be described later) is arranged in the first body 2A. The second body 2B is a member, which is arranged to the side that faces a palm, etc.

As shown in FIG. 1, the touch screen display 3, an incoming lamp 4, a proximity sensor 5, and an in-camera 6 are arranged in the first body 2A.

The touch screen display 3 is arranged to a front side of the first body 2A. As shown in FIG. 4, the touch screen display 3 has a cover glass 3a, a touch screen 3b, and a display 3c.

The cover glass 3a is a transparent glass plate, which is arranged to the outermost side of the touch screen display 3.

The touch screen 3b detects a touch to the touch screen display 3 with a finger, a stylus pen or the like. The touch screen 3b can detect a position(s) and/or a gesture of a plurality of fingers, a stylus pen or the like, which touch the touch screen display 3. The method for detecting a touch to the touch screen 3b with a finger, a stylus pen or the like may be an arbitrary method, such as a capacitive sensing method, a resistive film method, a surface acoustic wave method (or an ultrasonic sensing method), an infrared ray method, an electromagnetic induction method, or a load detecting method. Note that the cover glass 3a in the present embodiment has a function of a receiver to vibrate itself to conduct sound.

The display 3c is composed of a display device such as a liquid crystal display, an organic electroluminescent panel, or an inorganic electroluminescent panel. The display 3c can display an image such as characters and graphics. Note that the display 3c in the present embodiment has a function of a receiver to vibrate itself to conduct sound.

The incoming lamp 4 blinks in accordance with preset patterns, when receiving an incoming phone call or email. The incoming lamp 4 lights in a predetermined color, while recharging.

The proximity sensor 5 contactlessly detects an approach of an object to the first body 2A side. A sensor detection surface (not shown) of the proximity sensor 5 is provided, in orientation, to the front side of the first body 2A. For example, during a phone call, the proximity sensor 5 detects a user's face approaching the touch screen display 3. A photo sensor (not shown) is provided at the position of the proximity sensor 5. The photo sensor detects ambient brightness, thereby making it possible to adjust the display brightness as appropriate.

The in-camera 6 is a camera for photographing an object facing the first body 2A. Only a lens portion of the in-camera 6 is exposed from the first body 2A.

A power key 7 and a sound volume key 8 are arranged in a first direction of the body 2, on one lateral face which serves as a joining surface of the first body 2A and the second body 2B.

The power key 7 is operated in turning on/off the power, and in transition to or cancellation of a sleep mode, etc.

The sound volume key 8 is operated in adjusting sound volume on a phone call. The sound volume key 8 is composed of two keys. When one key is operated, the sound volume is turned up; and when the other key is operated, the sound volume is turned down.

External connection terminals and an external connection terminal cover (not shown) are arranged in the first direction of the body 2, on the other lateral face which serves as a joining surface of the first body 2A and the second body 2B. When not in use, the external connection terminals are covered by the external connection terminal cover.

As shown in FIG. 2, a speaker 9, an antenna 10, an infrared port 11, and an out-camera 12 are arranged in the second body 2B.

The speaker 9 externally outputs telephone ringtones, and various alarm tones.

The antenna 10 receives terrestrial television signals, etc. A main body (rod portion) of the antenna 10 is incorporated into the body 2, and is drawn out of the body 2 to be used, when watching television. FIG. 2 illustrates only a drawing portion of the antenna 10.

The infrared port 11 is a terminal for transmitting and receiving data through infrared communication.

The out-camera 12 is a camera for photographing an object facing the second body 2B. Only a lens portion of the out-camera 12 is exposed from the second body 2B.

As shown in FIG. 3, the second body 2B has a disassembly concave portion 13 to the bottom side (an end side) of the body 2. The disassembly concave portion 13 is a slit-shaped opening, which is used to separate the body 2 into the first body 2A and the second body 2B. The user inserts a fingernail or a tool into the disassembly concave portion 13, and applies a force in a direction to separate the second body 2B from the first body 2A, thereby making it possible to separate the first body 2A and the second body 2B.

Next, structures of a microphone unit 30 and peripheries thereof in the portable terminal device 1 are described. As shown in FIG. 4, an intermediate body 20 is arranged between the first body 2A and the second body 2B. A microphone 31 as a sound input unit (to be described later), a main body of the antenna 10, a battery, a memory card, an IC card, etc. (which are not shown) are arranged in the intermediate body 20. The intermediate body 20 has a first face 21 to the first body 2A side, and a second face 22 to the second body 2B side.

The microphone unit 30 is provided to the first face 21 side of the intermediate body 20. The microphone unit 30 has a microphone 31, a cushioning material 32, a cushioning material retaining portion 33, and a waterproof sheet 34.

The microphone 31 is an electronic component for converting sound produced by the user into sound signals, when making a phone call or recording sound. The microphone 31 has a sound collecting portion 31a serving as a sound input port. The microphone 31 is arranged so that the sound collecting portion 31a of the microphone 31 faces the intermediate body 20 side.

The cushioning material 32 is a member for substantially hermetically sealing a space where the microphone 31 is arranged between the first body 2A and the intermediate body 20. The cushioning material 32 is provided with an opening 32a for allowing sound to pass through, which is externally captured. The sound collecting portion 31a of the microphone 31, and the opening 32a of the cushioning material 32, are arranged to coincide with each other in a third direction (Z-direction) of the body 2. The cushioning material retaining portion 33 is a member for retaining the cushioning material 32 on the intermediate body 20.

The waterproof sheet 34 is a sheet-like member with a property, which allows air (sound) to pass through but does not allow water to pass through.

The intermediate body 20 has a communicating portion 23 to the disassembly concave portion 13 side of the second body 2B. In a first state (to be described later) where the second body 2B engages with the first body 2A, the communicating portion 23 serves as a region for establishing communication between the disassembly concave portion 13 of the second body 2B and the microphone 31. A first open end 23a (sound input side) of the communicating portion 23 faces the disassembly concave portion 13 of the second body 2B. A second open end 23b (sound output side) of the communicating portion 23 faces the microphone 31 (the waterproof sheet 34). A bent region 23c, which is bent at a substantially right angle, is provided between the disassembly concave portion 13 of the second body 2B and the microphone 31, in the communicating portion 23. Therefore, the communicating portion 23 has a substantial L-shape in a lateral face view. As shown in FIG. 4, when the user produces sound S for the portable terminal device 1, the sound S is captured from the disassembly concave portion 13 of the second body 2B, and is transmitted to the microphone 31 through the communicating portion 23 of the intermediate body 20.

EXPLANATION OF REFERENCE NUMERALS 1, 1A portable terminal device (portable electronic device)
2 body
2A first body
2B second body
13 disassembly concave portion
20, 20A intermediate body
20a end
21 first face
22 second face
23, 23A communicating portion
23c bent region
30 microphone unit
31 microphone (sound input unit)
31a sound collecting portion
32 cushioning material
32a opening
33 cushioning material retaining portion
34 waterproof sheet

The invention claimed is:

1. A portable electronic device, comprising:
   a first body;
   a second body, which can be arranged in either a first state of engaging with the first body, or a second state of not engaging with the first body, and one end side which has a concave portion, wherein the concave portion is configured to receive an external force so as to transition the first body and second body from the first state to the second state;
   a sound input unit, which is provided between the first body and the second body;
   a communicating portion for establishing communication between the concave portion of the second body and the sound input unit, in the first state; and
   a waterproof sheet between the sound input unit and the communicating portion, wherein the waterproof sheet allows sound to pass from the communicating portion to the sound input unit but does not allow water to pass from the communicating portion to the sound input unit.

2. The portable electronic device according to claim 1, wherein the communicating portion comprises at least one bent region between the concave portion of the second body and the waterproof sheet.

3. The portable electronic device according to claim 1, wherein the communicating portion establishes substantially linear communication between the concave portion of the second body and the waterproof sheet.

4. The portable electronic device according to claim 1, further comprising:
   an intermediate body, which is arranged between the first body and the second body, and which forms the communicating portion.

5. The portable electronic device according to claim 4, wherein, in the first state, the concave portion is on a lower side surface of the second body, and the lower side surface of the second body lies within a substantially same plane as a lower side surface of the first body; and
   wherein, in the first state, the concave portion of the second body is located closer to the lower side surface of the first body than any end of the intermediate body, the end being adjacent to the concave portion.

6. The portable electronic device according to claim 1, further comprising a cushioning material is located between the sound input unit and the communicating portion.

7. The portable electronic device according to claim 6, wherein the cushioning material is located between the sound input unit and the waterproof sheet.

8. The portable electronic device according to claim 6, wherein the sound input unit comprises a sound collecting portion, and wherein the cushioning material comprises an opening that is positioned to coincide with the sound collecting portion.

* * * * *